United States Patent Office 3,790,608
Patented Feb. 5, 1974

3,790,608
PROCESS FOR PREPARING EDIBLE FATS BY HYDROGENATION AND FRACTIONATION OF TRIGLYCERIDE FATTY OILS CONTAINING $C_{20}$ AND $C_{22}$ FATTY ACIDS
Brian Leonard Caverly, Meopham, England, Gerard Joseph Hendrik Meertens, Eindhoven, Netherlands, and John Barry Rossell, St. Albans, England, assignors to Lever Brothers Company, New York, N.Y.
No Drawing. Continuation of abandoned application Ser. No. 749,970, Aug. 5, 1968. This application July 23, 1971, Ser. No. 165,703
Claims priority, application Great Britain, Aug. 9, 1967, 36,657/67
Int. Cl. A23d 5/00; C11c 3/12
U.S. Cl. 260—409   18 Claims

ABSTRACT OF THE DISCLOSURE

A hard stearine butter for confectionery is prepared from a triglyceride oil containing mono- and poly-ethenoic acids of which 25 to 85% by weight of total fatty acids are unsaturated $C_{20}$ and $C_{22}$ acids, for instance a rapeseed or other crucifera oil, by selective hardening to an iodine value of between 70 and 85 with isomerization to a trans index of between 50 and 80, and fractionation to isolate a fat fraction of $D_{20}$ at least 1400 and $D_{35}$ below 300.

---

This is a continuation of application Ser. No. 749,970, filed Aug. 5, 1968, now abandoned.

This invention relates to a process for preparing edible fats.

Cocoabutter, cocoabutter substitutes, and other hard stearine butters used in confectionery require a special combination of melting properties in that they are relatively hard at ambient temperatures of up to about 30° C. and liquid at body temperature (38° C.), and therefore melt sharply between 30° C. and 38° C. The supply of natural fats meeting these requirements is insufficient to meet demand and it has been found necessary to modify other fats by chemical methods such as hardening and interesterification, and physical methods such as solvent fractionation, in order to obtain suitable materials. Natural fats containing a high proportion of the $C_{12}$ fatty acid lauric acid in their component glycerides, for instance palm kernel oil, are widely used, and it is also possible to modify fats containing large amounts of unsaturated $C_{18}$ acids in their glycerides, for instance soyabean, cottonseed, groundnut, olive and sunflower oils, to obtain hard stearine butters having the desired properties.

Conditions have now been found by which fats containing, in the form of triglycerides, high proportions of fatty acids of even longer chain length, for instance the $C_{22}$ monoethenoic acid erucic acid, can be modified to give in good yield a hard stearine butter having the desired melting characteristics. Hitherto it has been considered important for the production of good cocoabutter substitutes to ensure that, as in cocoabutter, the fatty acids present contain at least 20% of the saturated $C_{16}$ acid palmitic acid, or corresponding amounts of other saturated fatty acids. It has been found that using oils of iodine value less than 120 which contain high proportions of erucic acid, good cocoabutter substitutes are not obtainable in reasonable yield if the conditions of modification are such as to produce fats having substantial proportions of saturated fatty acids in their glycerides. Accordingly, with these oils the necessary conditions for making a good cocoabutter substitute in high yield are different from those with oils where $C_{18}$ fatty acids predominate. In particular, a substantial increase of saturated fatty acid content during the modification of the oil is to be avoided.

Erucic acid is a major constituent of the glycerides of many crucifera oils and the establishing of suitable conditions of modification enables the practical utilization of such oils, and especially rapeseed oil, as a source of hard stearine butters: a typical rapeseed oil can contain (as triglycerides) as much as 50% of erucic acid, and 55% of total unsaturated $C_{20}$ and $C_{22}$ fatty acids, by weight based on the total fatty acid content of the oil. Such rapeseed oils are especially favorable as starting materials because of their low content of saturated fatty acids. It is particularly advantageous to use high erucic acid-containing oils rather than oils whose major acid component is provided by unsaturated $C_{16}$ and $C_{18}$ acids, because during hardening of the polyethenoic acids present erucic acid is converted to trans-monoethenoic acids, such as brassidic acid, while the unsaturated $C_{18}$ acids oleic, linoleic and linolenic acids form trans-monoethenoic $C_{18}$ acids such as elaidic acid, and brassidic acid glycerides tend to give better physical properties than elaidic acid glycerides when the acids are present in equivalent amounts. The presence of brassidic acid in conjunction with elaidic acid enables the desired melting properties to be attained with a lower content of saturated fatty acids and hence can give a harder stearine butter, for the contribution of a brassidic acid residue towards a triglyceride of higher melting point is greater than that of an elaidic acid residue. As a product with the desired melting point can therefore be more easily obtained without increasing the saturated fatty acid content, this makes possible closer control of the hardening stage which is necessary to remove polyethenoic acids present in an oil. It has also been found that the use of oils high in unsaturated $C_{20}$ and $C_{22}$ acid content is preferable to the use of those high in unsaturated $C_{16}$ and $C_{18}$ acid content because of the oil hardened under suitable selective conditions produces a smaller amount of high melting products which have to be removed in the fractionation step, and gives a high yield of the desired fraction. The product obtained generally contains larger proportions of unsaturated fatty acid residues than stearine butters based upon fats of high unsaturated $C_{16}$ and $C_{18}$ fatty acid content.

A process of the invention is accordingly one for preparing a hard stearine butter in which a fatty acid triglyceride oil containing monoethenoic and polyethenoic fatty acids, of which $C_{20}$ and $C_{22}$ unsaturated acids provide from 25 to 85% by weight of the total fatty acids in the oil, is hydrogenated under conditions selective for the hardening of polyethenoic acids to monoethenoic acids until the iodine value of the oil is between 70 and 85, the drop in iodine value during the hydrogenation being at least 15, the trans index of the oil is raised to between 50 and 80 by isomerization, and a fat fraction having dilatations of $D_{20}$ at least 1400 and $D_{35}$ below 300 is isolated from the hardened isomerized oil by fractionation.

By triglyceride oil is meant an oil consisting essentially of triglycerides, though small amounts of partial glycerides and other fatty acid esters such as may occur in natural oils are acceptable: with increasing content of these however, the yield or quality of the product is lowered. Preferably the triglyceride oil used as starting material is one containing from 35 to 65% of $C_{20}$ and $C_{22}$ unsaturated fatty acids, and preferably from 25 to 60% of erucic acid. Preferably less than 10% or 8% and especially less than 6% of saturated fatty acids are present in the starting material. Substantial amounts of $C_{12}$ and lower fatty acids in the starting material should be avoided as they are liable to give rise to eutectic compositions in the final products. Preferably the total $C_{14}$ and $C_{16}$ acid content is less than 15%, and especially less than 10% of the total fatty acid, if high yields of product are to be obtained. In practice the starting oil will have an iodine value of not less than 90, and it is preferably between 90 and 120.

The triglyceride oil used is preferably a crucifera oil, and especially a rapeseed oil of adequate $C_{20}$ and $C_{22}$ fatty acid content. Other crucifera oils that can be used are mustardseed and white turnip seed oils, and crambe oil (the oil from the seeds of *Crambe abyssinica*); and tropaeolium oils, for instance nasturtium seed oil. The oil can be a natural oil (this includes a natural oil blend) which in practice has been bleached and refined, or it can be an oil modified by interesterification, or a blend of natural and interesterified oils. Acceptable results can be obtained, although in relatively lower yield, with fish oils, if necessary using suitable blending with other oils, even though fish oils are highly complex and contain large amounts of both saturated and polyethenoic acids: such oils are for instance herring, menhaden, anchovy and pilchard oils.

The conditions, including nature and quantity of catalyst, temperature and pressure, for a hydrogenation selective for the hardening of polyethenoic acids (which includes diethenoic acids) to monoethenoic acids, are well-known. Conventional catalysts employed in such hydrogenations are conducive to the isomerization of cis-ethenoic acids to trans-ethenoic acids, and a separate isomerization step is unnecessary using them, but if isomerization is required to bring the trans index of the hardened oil to the required value, namely between 50 and 80%, the oil is heated with an isomerizing catalyst. It is convenient to use a sulphurized nickel catalyst, for instance one containing 4 to 10% of sulphur by weight of nickel, for the simultaneous hardening and isomerization, or for a post-hardening isomerization where this is required. Alternatively isomerization can be effected before hardening. Palladium catalysts of satisfactory selectivity can also be used. Hydrogenation temperatures of 175° to 200 C. and pressures of about 1 to 6 atmospheres are generally convenient with a sulphurized nickel catalyst. Hydrogenation is preferably continued until polyethenoic acid has been substantially eliminated, as indicated by the iodine value reached in relation to the original acid content of the oil. The increase in saturated fatty acid content during the hydrogenation should in practice be less than 10% and preferably less than 5 or 6% by weight of the total fatty acids, this increase representing the degree of selectivity of the hydrogenation. The iodine value of the hardened oil submitted to fractionation is preferably in the range of from 72 to 77.

The hardened oil can be subjected to interesterification before fractionation, if desired, this being practically equivalent to using an interesterified oil for the hydrogenation.

The fractionation of fats is also a well-known process: in the form of wet-fractionation known as solvent fractionation, fats are fractionally crystallized from a suitable solvent, for instance acetone; the softer fractions composed of the lower melting glycerides remain behind in the solvent while the harder fats crystallize or precipitate in liquid form and are separated off. It has been found that in practice it is necessary to use relatively high proportions of solvent, for instance at least 8 parts by volume of acetone to 1 part by weight of fat, in order to avoid initial separation of the fat in the liquid phase during cooling. It is convenient to express the relative quantity of solvent in parts by volume and the fat in parts by weight, it being understood that liters to kilos or cc. to grams are intended. The amount of crystallization and therefore the fraction separated is controlled partly by adjustment of the initial concentration of the fat in the solution but mainly by the temperature to which the solution is cooled. Although a two-stage fractionation to isolate a mid-fraction is generally necessary, in some instances it is even possible to avoid a second stage and to achieve a product of satisfactory properties employing a one-stage fractionation where only a bottom, or oleine fraction, is removed. Where a two-stage fraction is employed, preferably the top (hard fat) fraction removed is less than 15 or 20% of the hardened oil before fractionation. Where a top fraction is removed it can be interesterified with a suitable proportion of bottom fraction and the resulting triglyceride can be blended with a natural oil starting material, preferably using small proportions, and the blended oil used in a process of the invention.

Preferably the fractionation is adjusted to produce a fat fraction having dilatations of $D_{30}$ at least 800, and especially at least 1000, of $D_{20}$ at least 1600 and especially at least 1700, and of $D_{35}$ less than 250.

The invention includes a hard stearine butter prepared from a crucifera oil by selective hydrogenation and solvent fractionation of the hardened isomerized oil comprising a fat fraction having dilatations of $D_{20}$ at least 1600, and preferably at least 1700, and $D_{30}$ at least 800, and preferably at least 1000, and $D_{35}$ below 300.

A confectioners' hard butter fractionated product from a process of the invention can be formulated with other suitable materials to form confections by the customary procedures including conching and tempering as required. Thus a chocolate material can be made by formulating the product with suitable flavoring, for instance cocoa-powder, sugar, milk powder, and lecithin. Suitable formulations are:

Formulation A (Milk chocolate): Parts by weight
Fractionated product _____ 35.5
Cocoa powder (containing 10–12% cocoa-butter) _____ 5
Icing sugar _____ 43
Skimmed milk powder _____ 16.5
Lecithin _____ 0.45

Formulation B (Milk chocolate):
Fractionated product _____ 30
Cocoa powder (containing 10–12% cocoa-butter) _____ 5
Icing sugar _____ 43
Full cream milk powder _____ 22
Lecithin _____ 0.45

Formulation C (Milk chocolate):
Fractionated product _____ 25
Cocoamass _____ 10
Icing sugar _____ 43
Full cream milk powder _____ 22
Lecithin _____ 0.45

Formulation D (Plain chocolate):
Fractionated product _____ 34
Cocoa powder (containing 10–12% cocoa-butter) _____ 21
Icing sugar _____ 45
Lecithin _____ 0.45

Formulation E (Plain chocolate):
Fractionated product _____ 30.5
Cocoamass _____ 7.5
Cocoa powder (containing 10–12% cocoa-butter) _____ 17
Icing sugar _____ 45
Lecithin _____ 0.45

Formulation F (Toffee):
Fractionated product _____ 6
Granulated sugar _____ 12
Glucose _____ 12
Full cream sweetened condensed milk _____ 12
Water _____ 1

By dilatation is meant the isothermal melting expansion expressed in cubic millimeters and referred to 25 grams of material, measured as described in British Pat. 827,172. ured by the recommended method described in J. Amer. Oil Chemists' Soc., 1959, 36, 627–31, and calculated as methyl elaidate.

The invention is illustrated by the following examples, in which temperatures are in C. The $C_{22}$ monoethenoic acid in the starting materials is wholly erucic acid.

EXAMPLE 1

A bleached and refined Danish (summer crop) rapeseed oil of acid value 0.1, saponification value 174, iodine value 103.7 and fatty acid composition shown in the table below was selectively hydrogenated using a supported nickel catalyst. The catalyst was one prepared by reduction of basic nickel carbonate on kieselguhr in an atmosphere of hydrogen at an elevated temperature followed by simultaneous sulphurization of the resulting nickel on kieselguhr powder with sulphur and controlled oxidation to give a non-pyrophoric nickel on kieselguhr catalyst containing 43% of nickel and 6.8% of sulphur by weight of nickel.

The oil (100 parts by weight) and catalyst (0.5 part) were stirred together in a hydrogenation autoclave under nitrogen and heated to 185° C.: hydrogen gas was then introduced from the bottom of the vessel into the mixture stirred at 500 r.p.m., with replacement of the nitrogen by venting off and then operation of the hydrogenation autoclave as a dead end system. Hydrogen was rapidly introduced until a pressure of 34 lb./in.$^2$ was attained, and hydrogen flow into the vessel then adjusted to maintain this pressure. Small samples of oil were removed by bleeding from time to time and their iodine value and slip melting point determined.

Hydrogenation was discontinued after 6 hours, when the iodine value of the filtered and cooled oil was 75.0, and its slip melting point was 33°. The dilatation of the hardened oil was measured at 20°, 30°, 35° and 40°, and its fatty acid content analyzed.

The hardened oil (100 parts by grams-weight) and dry acetone (900 parts by cc.-volume) were mixed and heated to 40°, then cooled to 10° during 20 minutes, the mixture allowed to stand for 30 minutes, the crystallized fat filtered off and washed three times with acetone (150 parts each time) at 10°: the washed crystals were heated to drive off most of the acetone remaining, and the small amount of residual acetone was removed by heating in a vacuum still, giving a fractionated oil product (60 parts) of iodine value 71.0, whose dilatations at 20°, 25°, 30° and 35° were measured, and fatty acid content again analyzed.

The fatty acid contents in percent by weight of total fatty acids, and other characteristics determined were as follows.

| | Starting material | Hardened oil | Fractionated oil |
|---|---|---|---|
| Iodine value | 103.7 | 75.0 | 71.0 |
| Acids: | | | |
| Saturated: | | | |
| $C_{16}$ | 3.5 | 3.4 | 3.1 |
| $C_{18}$ | 1.1 | 1.9 | 2.0 |
| $C_{20}$ | 0 | 0 | 0.7 |
| $C_{22}$ | 0.4 | 1.3 | 2.3 |
| Unsaturated: | | | |
| $C_{18}$ monoene | 16.3 | 40.2 | 32.8 |
| $C_{18}$ diene | 14.3 | 0 | 0 |
| $C_{18}$ triene | 9.7 | 0 | 0 |
| $C_{20}$ monoene | 8.1 | 8.1 | 6.1 |
| $C_{22}$ monoene | 46.4 | 45.1 | 53.0 |
| Total polyene | 25 | 0 | 0 |
| Total unsaturated $C_{20}$ and $C_{22}$ | 54.5 | 53.2 | 59.1 |
| Total saturated | 5.0 | 6.6 | 8.1 |
| Trans index | 0 | 67 | 75 |

The dilatations measured were as follows:

| | $D_{20}$ | $D_{25}$ | $D_{30}$ | $D_{35}$ | $D_{40}$ |
|---|---|---|---|---|---|
| Hardened oil | 1,375 | | 455 | 30 | 20 |
| Fractionated oil | 1,770 | 1,650 | 1,170 | 290 | |

Samples of the fractionated fat were converted into confections using Formulations A to F given above. The confection of Formulation A had excellent bloom-resistance, good resistance to finger-marking, a brittle fracture with good snap on breaking, and melted satisfactorily in the mouth. The moulded confection showed good mould release properties and gloss retention on release was excellent. The formulation can be used both with tempered and untempered confections, for instance in an untempered condition as a cake dressing. Formulations B to E also had satisfactory properties. Formulation F gave a brittle toffee with a good melt on the tongue.

EXAMPLE 2

A neutralized bleached rapeseed oil (500 g.) of iodine value 105.2 and fatty acid composition shown in the table below was selectively hydrogenated in a Normann hardening beaker using a sulphurized nickel catalyst (7.5 g.) and the mixture heated to 180° under carbon dioxide with stirring at 1000 r.p.m. Hydrogen was absorbed at a rate of 150 liters/hr. and reaction was discontinued after 30 minutes when the iodine value of the filtered and cooled oil was 74.5 and its slip melting point 34°: the oil was analyzed.

The hardened oil (100 parts by grams-weight) was dissolved in dry acetone (550 parts by cc.-volume) at 40° and the mixture cooled at a rate of 1° per 5 minutes to 6°, and held at that temperature for an hour. The crystals were then separated by decantation and washed three times with acetone (200 parts by cc.-volume) at 6°, and freed from traces of acetone. The product, which had a slip melting point of 35°, was then analyzed.

| | Starting material | Hardened oil | Fractionated oil |
|---|---|---|---|
| Iodine value | 105.2 | 74.5 | 72.4 |
| Acids: | | | |
| Saturated: | | | |
| $C_{16}$ | 3.7 | 3.7 | 3.8 |
| $C_{18}$ | 1.0 | 2.2 | 3.0 |
| $C_{20}$ | Trace | 0.7 | Trace |
| $C_{22}$ | Trace | 2.2 | 2.8 |
| Unsaturated: | | | |
| $C_{18}$ monoene | | 30.4 | 29.9 |
| $C_{18}$ diene | 38.8 | 6.5 | 5.4 |
| $C_{18}$ triene | | 0 | 0 |
| $C_{20}$ monoene | 8.5 | 8.5 | 8.1 |
| $C_{22}$ monoene | 47.8 | 45.6 | 47.0 |
| Total unsaturated $C_{20}$ and $C_{22}$ | 56.3 | 57.0 | 57.9 |
| Total saturated | 4.7 | 8.8 | 9.6 |
| Trans index | 0 | 63 | 74 |

The dilatations measured were as follows:

| | $D_{20}$ | $D_{25}$ | $D_{30}$ | $D_{35}$ | $D_{40}$ |
|---|---|---|---|---|---|
| Hardened oil | 1,320 | 840 | 280 | 0 | |
| Fractionated oil | 1,680 | 1,370 | 850 | 100 | 0 |

EXAMPLE 3

A neutral unbleached East German rapeseed oil of acid value 0.04, saponification value 173.1 and iodine value 103.1, and fatty acid composition shown in the table below was selectively hydrogenated as described in Example 1 except that 1 part by weight of the catalyst was used, and hydrogenation was discontinued after 2 hours, when the iodine value of the hydrogenated oil was 73.6, and its slip melting point 35.3°. The oil was analyzed and (100 parts by grams-weight) mixed with dry acetone (900 parts by cc.-volume), the mixture heated to 40°, then cooled to 10° at the rate of 2° per minute, held at 10° for 30 minutes, and the crystallized fat filtered off and washed three times with acetone (100 parts each time) at 10°. The washed crystals (60 parts) were redissolved in acetone (540 parts), the mixture heated to 40° and cooled at the rate of 1° per minute to 22.5°: after 30 minutes at that temperature the crystallized fat was filtered off, washed three times with acetone (60 parts) at 22.5°, and acetone removed from the combined filtrate to give a fractionated product (49 parts) of slip melting point 35.5°, which was analyzed.

The fatty acid contents (percent by weight of total fatty acids) and other characteristics determined were as follows.

|  | Starting material | Hardened oil | Fractionated oil |
|---|---|---|---|
| Iodine value | 103.1 | 73.6 | 71.4 |
| Acids: |  |  |  |
| Saturated: |  |  |  |
| $C_{16}$ | 3.6 | 3.1 | 3.3 |
| $C_{18}$ | 1.0 | 2.3 | 2.5 |
| $C_{20}$ | Trace | 1.1 | 0.8 |
| $C_{22}$ | Trace | 1.9 | 1.8 |
| Unsaturated: |  |  |  |
| $C_{18}$ | 13.0 | 32.7 | 31.2 |
| $C_{18}$ | 14.9 | 2.1 | 4.0 |
| $C_{18}$ monoene | 13.0 | 32.7 | 31.2 |
| $C_{18}$ diene | 14.9 | 2.1 | 4.0 |
| $C_{18}$ triene | 9.9 | 0 | 0 |
| $C_{20}$ monoene | 10.0 | 9.3 | 7.2 |
| $C_{22}$ monoene | 47.5 | 47.3 | 48.5 |
| Total polyene | 25.8 | 2.1 | 4.0 |
| Total unsaturated $C_{20}$ and $C_{22}$ | 57.5 | 56.6 | 55.7 |
| Total saturated | 4.6 | 8.4 | 8.4 |
| Trans index | 0 | 58.7 | 66.1 |

The dilatations measured were as follows:

|  | $D_{20}$ | $D_{25}$ | $D_{30}$ | $D_{35}$ | $D_{40}$ |
|---|---|---|---|---|---|
| Hardened oil | 1,420 | 1,140 | 700 | 145 | 15 |
| Fractionated oil | 1,780 | 1,715 | 1,290 | 260 | 0 |

EXAMPLE 4

The rapeseed oil starting material of Example 3 was randomly interesterified by heating to 105° with 0.5% by weight of sodium methoxide in an inert atmosphere for 5 minutes, cooled and washed with water until free from alkali. Analysis showed the resulting interesterified oil to have the same specification as the starting material.

The interesterified oil was selectively hydrogenated as described in Example 3 during 4 hours, after which the filtered and cooled oil had an iodine value of 74.9 and a slip melting point of 35.1°. The oil was analyzed and (100 parts by grams-weight) mixed with dry acetone (900 parts by cc.-volume) the mixture heated to 40°, then cooled to 10° at the rate of 2° per minute, held at 10° for 30 minutes, and the crystallized fat filtered off and washed three times with acetone (100 parts each time) at 10°. The washed crystals (49 parts) were redissolved in acetone (450 parts) at 40° and the solution cooled to 23° at the rate of 1° per minute: after 30 minutes at that temperature the crystallized fat was filtered off, washed three times with acetone (25 parts) at 23°, and the combined filtrate evaporated to give a fractionated product (32 parts) of slip melting point 34.1°, which was analyzed.

The fatty acid contents (percent by weight of total fatty acids) and other characteristics determined were as follows.

|  | Starting material | Hardened oil | Fractionated oil |
|---|---|---|---|
| Iodine value | 103.1 | 74.9 | 72.1 |
| Acids: |  |  |  |
| Saturated: |  |  |  |
| $C_{16}$ | 3.6 | 3.2 | 3.9 |
| $C_{18}$ | 1.0 | 2.1 | 2.0 |
| $C_{20}$ | Trace | 0.6 | 1.1 |
| $C_{22}$ | Trace | 1.2 | 1.0 |
| Unsaturated: |  |  |  |
| $C_{18}$ monoene | 13.0 | 29.6 | 25.2 |
| $C_{18}$ diene | 14.9 | 6.1 | 1.8 |
| $C_{18}$ triene | 9.9 | 0 | 0 |
| $C_{20}$ monoene | 10.0 | 8.2 | 9.5 |
| $C_{22}$ monoene | 47.5 | 49.0 | 55.5 |
| Total polyene | 25.8 | 6.1 | 1.8 |
| Total unsaturated $C_{20}$ and $C_{22}$ | 57.5 | 57.2 | 65.8 |
| Total saturated | 4.6 | 7.1 | 8.0 |
| Trans index | 0 | 66.7 | 65.0 |

The dilatations measured were as follows:

|  | $D_{20}$ | $D_{25}$ | $D_{30}$ | $D_{35}$ | $D_{40}$ |
|---|---|---|---|---|---|
| Hardened oil | 1,310 |  | 545 | 115 | 15 |
| Fractionated oil | 1,775 | 1,690 | 1,285 | 65 | 20 |

EXAMPLE 5

A neutral crambe oil of acid value 0.50, saponification value 169.4 and iodine value 95.3, and fatty acid composition shown in the table below, was selectively hydrogenated under the conditions described in Example 1 except that the temperature was 180°. Hydrogenation was completed in 7 hours and the filtered and cooled oil had an iodine value of 74.6 and a slip melting point of 33.0 and was analyzed. The oil (100 parts by grams-weight) was dissolved in dry acetone (90 parts by cc.-volume) at 35° to give a clear solution which was cooled to 10° at the rate of 3° per minute, held at 10° for 30 minutes and washed three times with acetone (50 parts each time) at 10°. The washed crystals (63 parts) were redissolved in acetone (560 parts) at 35° and the solution cooled to 22.5° at the rate of 1° per minute: after 30 minutes at that temperature the crystallized fat was filtered off, washed three times with acetone (30 parts each time) at 22.5° and the combined filtrate evaporated to give a fractionated product (57 parts) of slip melting point 34.5°, which was analyzed.

The fatty acid contents (percent by weight of total fatty acids) and other characteristics determined were as follows.

|  | Starting material | Hardened oil | Fractionated oil |
|---|---|---|---|
| Iodine value | 95.3 | 74.6 | 72.4 |
| Acids: |  |  |  |
| Saturated: |  |  |  |
| $C_{16}$ | 2.8 | 2.8 | 1.6 |
| $C_{18}$ | 0.8 | 1.3 | 1.6 |
| $C_{20}$ | 0.3 | 0.3 | 0.6 |
| $C_{22}$ | 0.5 | 2.4 | 2.9 |
| Unsaturated: |  |  |  |
| $C_{18}$ monoene | 15.9 | 32.6 | 31.8 |
| $C_{18}$ diene | 10.2 | 1.6 | 1.6 |
| $C_{18}$ triene | 7.8 | 0 | 0 |
| $C_{20}$ monoene | 4.8 | 3.3 | 2.3 |
| $C_{22}$ monoene | 56.8 | 55.5 | 57.7 |
| Total polyene | 18.0 | 1.6 | 1.6 |
| Total unsaturated $C_{20}$ and $C_{22}$ | 61.6 | 58.8 | 60.0 |
| Total saturated | 4.4 | 6.8 | 6.7 |
| Trans index | 0 | 63 | 62.4 |

The dilatations measured were as follows:

|  | $D_{20}$ | $D_{25}$ | $D_{30}$ | $D_{35}$ | $D_{40}$ |
|---|---|---|---|---|---|
| Hardened oil | 1,345 |  | 460 | 70 | 5 |
| Fractionated oil | 1,780 | 1,665 | 1,115 | 140 | 15 |

EXAMPLE 6

A neutral mustardseed oil of acid value 0.16, saponification value 177.8 and iodine value 115.5 was selectively hydrogenated (6 hours) and subjected to a two-stage fractionation as described in Example 3, except that the hydrogenation temperature was 180°, and in the first fractionation stage a yield of 50 parts of crystals was obtained, which was dissolved in acetone (450 parts) for the second stage, in which the crystallization temperature was 21.5°, to give a yield of 40 parts of final product.

The fatty acid contents (percent by weight of total fatty acids) and other characteristics determined were as follows.

|  | Starting material | Hardened oil | Fractionated oil |
|---|---|---|---|
| Iodine value | 115.5 | 76.8 | 71.5 |
| Slip melting point |  | 34.1 | 34.6 |
| Acids: |  |  |  |
| Saturated: |  |  |  |
| $C_{16}$ | 4.1 | 3.9 | 3.4 |
| $C_{18}$ | 1.4 | 3.1 | 3.4 |
| $C_{20}$ | Trace | 1.0 | 1.7 |
| $C_{22}$ | Trace | 1.4 | 1.8 |
| Unsaturated: |  |  |  |
| $C_{18}$ monoene | 21.8 | 48.9 | 45.7 |
| $C_{18}$ diene | 20.0 | 2.4 | 3.6 |
| $C_{18}$ triene | 12.6 | 0 | 0 |
| $C_{20}$ monoene | 11.6 | 11.3 | 11.6 |
| $C_{22}$ monoene | 27.9 | 27.9 | 28.7 |
| Total polyene | 32.6 | 2.4 | 3.6 |
| Total unsaturated $C_{20}$ and $C_{22}$ | 39.5 | 39.2 | 40.3 |
| Total saturated | 5.5 | 9.4 | 10.3 |
| Trans index | 0 | 59.8 | 65.5 |

The dilatations measured were as follows:

|  | $D_{20}$ | $D_{25}$ | $D_{30}$ | $D_{35}$ | $D_4{}^0$ |
|---|---|---|---|---|---|
| Hardened oil | 1,270 |  | 400 | 50 | 0 |
| Fractionated oil | 1,830 | 1,720 | 1,140 | 75 | 10 |

EXAMPLE 7

The mustardseed oil starting material of Example 6 was randomly interesterified by heating to 105° with 0.5% by weight of sodium methoxide in an inert atmosphere for 5 minutes, cooled and washed with water until free from alkali. Analysis showed the resulting interesterified oil to have the same specification as the starting material.

The interesterified oil was selectively hydrogenated and subjected to a two-stage fractionation (5 hours) as described in Example 3; in the first fractionation stage a yield of 45 parts of crystals was obtained, which was dissolved in acetone (400 parts) for the second stage, in which the crystallization temperature was 22°, to give a yield of 30 parts of final product.

The characteristics determined as before were as follows.

|  | Starting material | Hardened oil | Fractionated oil |
|---|---|---|---|
| Iodine value | 115.5 | 72.6 | 70.1 |
| Slip melting point |  | 35.3 | 33.7 |
| Acids: |  |  |  |
| Saturated: |  |  |  |
| $C_{16}$ | 4.1 | 3.5 | 5.1 |
| $C_{18}$ | 1.4 | 4.0 | 4.7 |
| $C_{20}$ | Trace | 1.6 | 1.8 |
| $C_{22}$ | Trace | 1.6 | 1.0 |
| Unsaturated: |  |  |  |
| $C_{18}$ monoene | 21.8 | 48.4 | 42.2 |
| $C_{18}$ diene | 20.0 | 3.0 | 2.4 |
| $C_{18}$ triene | 12.6 | 0 | 0 |
| $C_{20}$ monoene | 11.6 | 11.2 | 12.1 |
| $C_{22}$ monoene | 27.9 | 26.6 | 30.7 |
| Total polyene | 32.6 | 3.0 | 2.4 |
| Total unsaturated $C_{20}$ and $C_{22}$ | 39.5 | 37.8 | 42.8 |
| Total saturated | 5.5 | 10.7 | 12.6 |
| Trans index | 0 | 59.6 | 61.9 |

The dilatations measured were as follows:

|  | $D_{20}$ | $D_{25}$ | $D_{30}$ | $D_{35}$ | $D_{40}$ |
|---|---|---|---|---|---|
| Hardened oil | 1,260 |  | 570 | 135 | 10 |
| Fractionated oil | 1,785 | 1,730 | 1,285 | 245 | 15 |

EXAMPLE 8

A neutral pilchard oil of acid value 0.1, saponification value 191.0 and iodine value 206.0, having a saturated fatty acid content of 30.5% (by weight of total fatty acids), about 34% of monoethenoic and about 35% of polyethenoic acids, and about 38% of unsaturated $C_{20}$ and $C_{22}$ acids, was subjected to a selective hydrogenation and two-stage fractionation similar to that described in Example 3; the hydrogenation temperature was 180°, 2.0% of catalyst was used, hydrogenation was discontinued after 11 hours when the iodine value had dropped to 84.5 and the slip melting point of the oil was 32.3°. The total saturated fatty acid content of the hydrogenated oil was 31% and only a small proportion of polyethenoic acids remained, the trans index being 67.2. Fractionation temperatures of 0° and 22° were used for the first and second stages. A 43% yield was obtained from the first stage, and a 33% overall yield in the second.

The slip melting point of the final product was 34.0, its trans index 58.4, and its dilatations as follows:

| | |
|---|---|
| $D_{20}$ | 1,640 |
| $D_{25}$ | 1,495 |
| $D_{30}$ | 945 |
| $D_{35}$ | 190 |
| $D_{40}$ | 0 |

What is claimed is:

1. A process for preparing a hard stearine butter comprising hydrogenating a fatty acid triglyceride oil having combined esterified monoethenoic and polyethenoic fatty acids, of which $C_{20}$ and $C_{22}$ unsaturated acids provide from 25 to 85% by weight of the total fatty acids in the oil, under conditions selective for the hardening of polyethenoic acids to monoethenoic acids until the iodine value of the oil is between 70 and 85, the drop in iodine value during the hydrogenation being at least 15, the trans index of the oil is raised to between 50 and 80 and isolating a fat fraction having dilatations of $D_{20}$ at least 1600 and $D_{35}$ below 300 from the hardened isomerized oil by solvent fractionation.

2. A process according to claim 1, in which the triglyceride oil used contains from 35 to 65% of combined $C_{20}$ and $C_{22}$ unsaturated fatty acids.

3. A process according to claim 2, in which the triglyceride oil used contains from 25 to 60% of combined erucic acid.

4. A process according to claim 1, in which the triglyceride oil used is a crucifera oil.

5. A process according to claim 4, in which the triglyceride oil used is a rapeseed oil.

6. A process according to claim 4, in which the triglyceride oil used is crambe oil.

7. A process according to claim 1, in which the oil is a natural oil.

8. A process according to claim 1, in which the oil is an interesterified oil.

9. A process according to claim 1, in which the triglyceride oil contains less than 10% of saturated fatty acids.

10. A process according to claim 1, in which the iodine value of the triglyceride oil before hydrogenation is between 90 and 120.

11. A process according to claim 1 in which the increase in combined saturated fatty acid content during the hydrogenation is less than 6% by weight of the total fatty acids.

12. A process according to claim 1, in which the iodine value of the hardened oil submitted to fractionation is in the range of from 72 to 77.

13. A process according to claim 1, in which acetone is used as solvent in the proportion of at least 8 by volume to 1 by weight of the hardened oil.

14. A process according to claim 1, in which the fractionation is a two-stage fractionation to isolate a midfraction and the top fraction removed is less than 20% of the hardened oil.

15. A process according to claim 1, in which the fractionation is a one-stage fractionation where a bottom fraction only is removed.

16. A process according to claim 1, in which the fractionation is such as to produce a fat fraction having a dilatation $D_{20}$ of at least 1700.

17. A process according to claim 1, in which the fractionation is such as to produce a fat fraction having dilatations $D_{30}$ of at least 800 and $D_{35}$ below 300.

18. A process according to claim 3, wherein the hydrogenation is effected at a temperature of about 175° C. to about 200° C. and a pressure of about 1 to 6 atmospheres using a nickel catalyst.

(References on following page)

References Cited

UNITED STATES PATENTS

| | | | |
|---|---|---|---|
| 3,459,777 | 8/1969 | Seiden | 260—409 |
| 2,942,984 | 6/1960 | Wissebach | 99—118 |
| 2,975,060 | 3/1961 | Best et al. | 99—118 |
| 3,333,968 | 8/1967 | Bell et al. | 99—166 |

FOREIGN PATENTS

| | | |
|---|---|---|
| 1,062,121 | 3/1967 | Great Britain. |

OTHER REFERENCES

Chemical Abstracts, vol. 53, 3737a (1959).

LEWIS GOTTS, Primary Examiner

DIANA G. RIVERS, Assistant Examiner

U.S. Cl. X.R.

99—118 H, 24, 134 R